2 Sheets--Sheet 1.

G. JESSUP.

Seeding-Machines.

No. 5,917. Reissued June 16, 1874.

Witnesses:
Alex Malone
N B Smith

Gilbert Jessup
Inventor:
L. Bickford, Thomas, Ludlow & Rodgers, and C. E. Patric, Assignees,
by A. M. Smith, Attorney AM. PHOTO-LITHOGRAPHIC Co. N. Y. (OSBORNE'S PROCESS)

2 Sheets--Sheet 2.

G. JESSUP.

Seeding-Machines.

No. 5,917. Reissued June 16, 1874.

Witnesses:
Alex Mahon
N B Smith

Gilbert Jessup
Inventor:
L. Bickford, Thomas, Ludlow & Rodgers,
and C. E. Patrie, Assignees
by A. M. Smith, Attorney AM. PHOTO-LITHOGRAPHIC Co. N. Y. (OSBORNE'S PROCESS.)

UNITED STATES PATENT OFFICE.

GILBERT JESSUP, OF SHORTSVILLE, ASSIGNOR, BY MESNE ASSIGNMENTS, TO LYMAN BICKFORD, OF MACEDON, NEW YORK, AND THOMAS, LUDLOW & RODGERS AND CHARLES E. PATRIC, OF SPRINGFIELD, OHIO.

IMPROVEMENT IN SEEDING-MACHINES.

Specification forming part of Letters Patent No. 32,627, dated June 25, 1861; reissue No. 2,782, dated October 22, 1867; reissue No. 5,917, dated June 16, 1874; application filed May 15, 1874.

*To all whom it may concern:*

Be it known that GILBERT JESSUP, of Shortsville, (formerly of Chapinville,) in the county of Ontario, State of New York, did invent certain new and useful Improvements in Seeding-Machines; and we do hereby declare the following to be a full, clear, and exact description of the same, reference being had to the accompanying drawings, in which—

Figure 2:
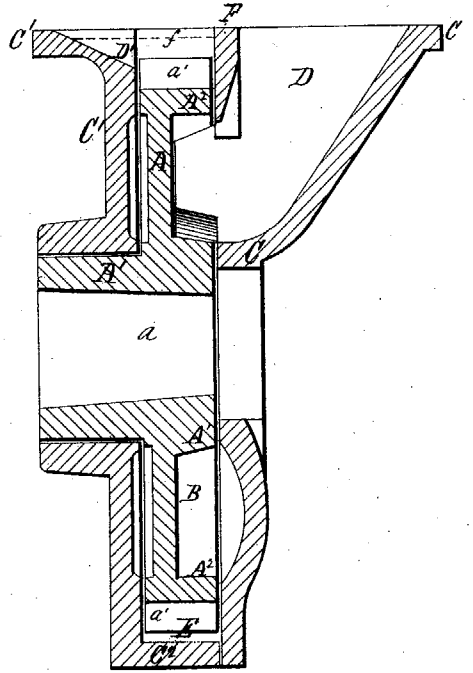
Figure 1:
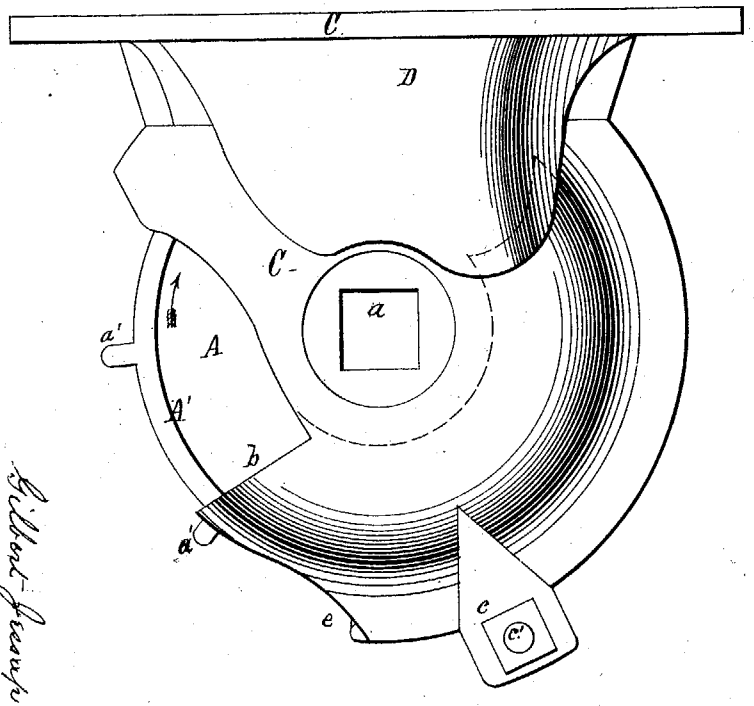
Figure 4:
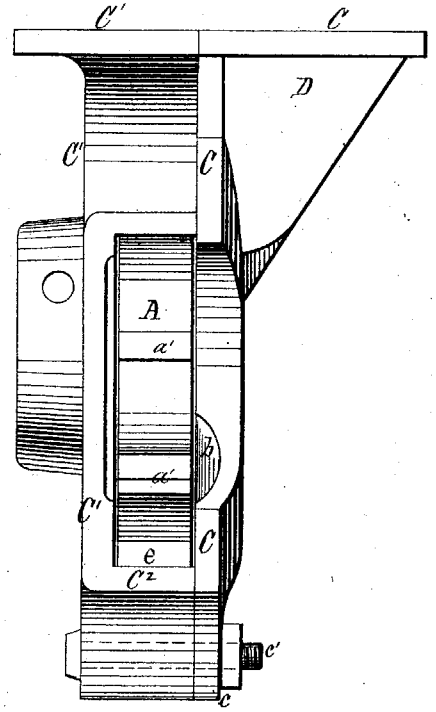
Figure 3:
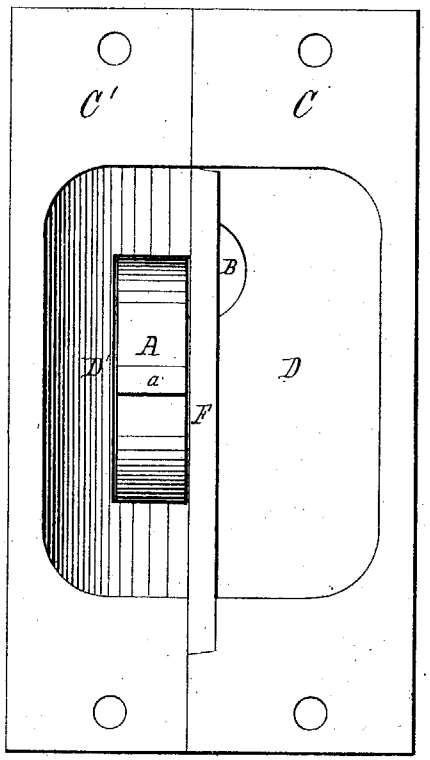

Figure 1 represents a side elevation of the improved distributing-wheel and its casing. Fig. 2 is a vertical transverse section; Fig. 3, a plan or top view, and Fig. 4 a rear elevation of the same.

Similar letters of reference denote corresponding parts in all the figures.

The invention relates to a novel construction of the distributing-wheel and its casing, for adapting the wheel to discharge the grain continuously, and in an even regular stream through a channel formed at the side or vertical face of the wheel; and it further relates to the construction of the casing, and its arrangement relatively to the wheel, whereby two discharging-channels are provided, one adapted to the discharge and distribution of larger, and the other of smaller, grain, and either of which may be used independently of the other, as the size or nature of the grain to be distributed may require.

The construction and arrangement of parts adopted for carrying out the invention, in practice, will be best understood from the following description with reference to the drawings, in which—

A represents the distributing wheel or disk, provided with a central hub or boss, $A^1$, having a squared or polygonal tapering perforation, *a*, for the reception of the horizontal driving-shaft, and at the outer edge of this vertical wheel or disk is formed a projecting rim or flange, $A^2$, between which and the hub is a channel or groove, B. The wheel A, by means of its hub $A^1$, is journaled in the plate $C^1$ of the casing, which is formed in two parts, C $C^1$, divided vertically and longitudinally, as shown, and united, when the wheel A is put in place between them, by means of bolts at *c'* passing through perforated lugs or ears *c* formed on the casing-plates. These plates C $C^1$ are provided at their upper edges with horizontal flanges, adapting them to be secured to the bottom of the hopper or grain-box, and the plate C at its upper edge is curved or bent outward laterally to form a funnel-shaped cup or secondary hopper, D, open at its top to receive the grain from the main hopper or grain-box, to which the casing C $C^1$ is connected, and converging thence downward as it descends to where it communicates with the channel B at the side of the wheel, for directing the grain received from the hopper thereto. From the lower end of this secondary hopper the swell in the casing may be continued, conforming in its direction to the curvature of the channel at the side of the wheel in front of and underneath the hub or axle, as shown in Fig. 1, to the outlet, opening, or point of discharge at *b*, which, by preference, is located in rear of the axial center, above the lowest point of, and at the side of, the wheel A, as shown. The casing-plate $C^1$, which is also provided with a secondary hopper, $D^1$, as shown, extends beyond the periphery of the wheel in front and underneath, and is provided with a flange or rim, $C^2$, which covers the periphery of the wheel at said points, but sufficiently far removed therefrom to form a channel, E, between the periphery of the wheel and the flange, of less capacity than the channel B, and intended for the distribution of smaller grain, said channel having its outlet at *e*. (See Fig. 4.) Between the mouths of the secondary hoppers D $D^1$ is a partition-plate, F, secured at its ends in notches or sockets in the casing-plates C $C^1$, said plate being made flush on its upper face with the upper face of the flanges of said casing, and conforming on its under face to the upper portion of the flange or periphery of the wheel A. A movable plate or cover, indicated by dotted lines at *f*, Fig. 2, serves to cover one or the other of the seed-channels B or E, and, in connection with the partition F, enables the operator to use either of the channels for the discharge of the grain as the size, character, or condition may require or suggest. The flange $A^2$ is provided on its outer face with ribs or starts $a'$, and it may also be fluted on its inner face for increasing its efficiency in acting upon and moving the grain through the channel to the point of discharge.

The operation will be readily understood. A number of the vertical distributing-wheels A with their respective casings are secured to the bottom of the grain box or hopper, conforming to the number of hoes or drill-teeth employed, these wheels being placed in the same transverse line, and operated by a common squared or polygonal shaft, of slightly less diameter than the perforations through the hubs of the wheels A, to avoid cramping said wheels, and to leave them a slight freedom of movement or play in their bearings in the casing-plates, and at the same time sufficiently large to insure the rotation of the wheels with the shaft, and as the machine is drawn forward a forward rotation in the direction indicated by the arrow, Fig. 1, is imparted to the shaft and distributing-wheels A through any suitable or preferred arrangement of gearing connecting their driving-shaft with the main driving wheels or axle. Supposing the channel E to be closed by the cover-plate, indicated at *f*, Fig. 2, in dotted lines, placed over the secondary hopper D′ communicating therewith, the grain from the grain-box or main hopper enters the secondary hopper D, and is directed thereby to the channel B at the side or vertical face of the wheel, and is brought into contact with the moving face and flange of the wheel, and is conveyed thereby to the point of discharge or outlet-opening *b* at the side of the wheel, whence it descends through the usual or any preferred arrangement of conductor-tubes and drill-teeth to the ground. When the smaller channel, E, is to be used, the cover is removed therefrom, and placed over the mouth of the hopper D.

From the foregoing description of the construction and operation of the parts, it will be seen that the side or vertical face of a wheel rotating on a horizontal axis is made available in giving a positive movement to the grain from the time it enters the secondary hopper D in the casing of said wheel until it leaves the channel B on the side of the wheel at the point of side delivery or discharge-opening *b*; and, further, that this operation or positive movement is materially assisted by the moving inner face of the outer flange or rim forming one side of the channel, and upon or in contact with which flange the grain is moved steadily onward to the point of discharge. From the fact that the side or face of the wheel moving in a vertical plane is thus used for discharging the grain, the wheel is denominated a vertical distributing-wheel.

The location of the feed-channel B relatively to the hopper and distributing-wheel, in connection with the fact that a large proportion of the walls of said channel is formed by the moving surface of the disk or wheel, which tends to draw in the contents of the hopper, causes the channel B to be entirely filled with grain, and as said grain is being steadily moved onward, and discharged by such movement of the disk or wheel, it will be evident that the amount of grain discharged or distributed will be governed by the size or capacity of the channel and the speed of rotation of the distributing-wheel, but at any given rate of speed of the wheel the amount of grain passing through said channel in a given time will always be the same.

An increase in the speed at which the machine is drawn will, of course, increase the speed of the distributing-wheel, and vice versa; and hence an uniform quantity of seed will be distributed in passing over a given space, thus making the channel B to constitute an accurate measuring-channel. This measuring-channel B may, as above explained, be formed wholly in the side of wheel, or it may be formed partly in the wheel and partly in the side casing of the wheel, as shown in the drawings.

Among the advantages of thus distributing or delivering the grain through a measuring-channel formed at the side of the wheel the following may be enumerated as important, viz: First, all liability of crushing or injuring the grain is effectually avoided. Second, a continuous and even flow of the grain is insured, from the fact that the grain, as it is delivered from the secondary hopper or seed-cup, is brought into contact with the moving surface of the wheel and is carried forward thereby and at the same rate of speed with said surface, consequently all bunching or uneven delivery of the grain is avoided. Third, the grain is carried through the measuring-channel by the rotating wheel, and is thereby measured and delivered with the utmost accuracy, and this accuracy is not disturbed by driving over rough or uneven ground, nor by having a greater or less quantity of grain in the grain-box or hopper. Fourth, there is no possibility of wasting seed by shaking or jarring the machine when not in motion, while at the same time the measuring-channel is full of grain and ready to commence the discharge of the same the instant the machine is put in motion, thereby effectually avoiding skips or balks in seeding. Fifth, all liability of clogging or choking from bits of straw, sticks, or wheat-beards is avoided, as such obstructing materials coming from the seed-cup or secondary hopper are necessarily brought into contact with the moving surface of the wheel, and are immediately carried forward and passed out at the discharge-outlet thereby.

Having thus described the invention, what we claim therein as new and of the invention of the said GILBERT JESSUP, and desire to secure by Letters Patent, is—

1. The combination, with the vertical distributing-wheel, of the casing, provided with a grain-cup or secondary hopper for receiving the grain and conducting it to the side of the distributing-wheel.

2. The combination of the vertical distributing-wheel and the casing forming the secondery hopper and measuring-channel at the side of the wheel through which the grain is fed to the discharge-outlet.

3. The distributing disk or wheel, provided on its vertical side or face with a flange or rim, by means of which the grain is carried by the rotation of the wheel to the side outlet or discharge-opening.

4. The vertical distributing-wheel, provided with an external flange or rim, and a central boss or hub which has its bearing in the side casing, and between which flange and hub the channel is formed, through which the grain is conveyed from the hopper to the discharge-outlet.

5. The flanged distributing-wheel and its casing, constructed and arranged substantially as described, so as to afford two discharge passages or channels, one for large the other for small grain, and either of which may be used independently of the other, for the purpose as set forth.

6. The vertical distributing-wheel and its casing, having two discharge openings or channels, in combination with a partition-plate and movable cover, by means of which either of said discharge-openings may be closed, as set forth.

7. The side casing of the vertical distributing-wheel cut away or provided with an opening permitting the discharge of the grain laterally at the vertical side of the wheel.

LYMAN BICKFORD,
THOMAS, LUDLOW & RODGERS,
By A. R. LUDLOW, *President.*
CHARLES E. PATRIC.

Witnesses to the signature of L. BICKFORD:
MARTIN DEAN,
S. N. GALLUP.

Witnesses to the signatures of A. R. LUDLOW and CHARLES E. PATRIC:
A. P. LINN COCHRAN,
J. S. BOGLE.